United States Patent
Guo et al.

(10) Patent No.: US 9,258,360 B2
(45) Date of Patent: Feb. 9, 2016

(54) INTELLIGENT DISASTER RECOVERY FOR DATABASE CONNECTION FAILURES

(75) Inventors: Sherry Guo, Fremont, CA (US); Bilung Lee, Fremont, CA (US); Paul Ostler, Boise, ID (US)

(73) Assignee: International Business Machines Corporation, Armonk, NY (US)

(*) Notice: Subject to any disclaimer, the term of this patent is extended or adjusted under 35 U.S.C. 154(b) by 706 days.

(21) Appl. No.: 11/936,400

(22) Filed: Nov. 7, 2007

(65) Prior Publication Data

US 2009/0119536 A1    May 7, 2009

(51) Int. Cl.
G06F 11/00    (2006.01)
H04L 29/08    (2006.01)
H04L 29/14    (2006.01)

(52) U.S. Cl.
CPC ........ H04L 67/1034 (2013.01); H04L 67/1002 (2013.01); H04L 69/40 (2013.01)

(58) Field of Classification Search
CPC ......................... G06F 11/2028; G06F 11/2097
USPC .............................. 714/2, 4, 4.1, 4.11, 6.3, 11
See application file for complete search history.

(56) References Cited

U.S. PATENT DOCUMENTS

| | | | |
|---|---|---|---|
| 6,763,479 B1 | 7/2004 | Hebert | |
| 7,395,324 B1* | 7/2008 | Murphy et al. | 709/223 |
| 7,657,657 B2* | 2/2010 | Rao et al. | 709/248 |
| 8,392,612 B2* | 3/2013 | Simon et al. | 709/245 |
| 8,522,086 B1* | 8/2013 | Garrett | 714/48 |
| 2004/0199812 A1* | 10/2004 | Earl et al. | 714/13 |
| 2005/0055325 A1* | 3/2005 | Dutt et al. | 707/1 |
| 2005/0105524 A1 | 5/2005 | Stevens et al. | |
| 2005/0165962 A1* | 7/2005 | Simon et al. | 709/245 |
| 2005/0193245 A1 | 9/2005 | Hayden et al. | |
| 2005/0213531 A1 | 9/2005 | Nanda | |
| 2006/0031394 A1* | 2/2006 | Tazuma | 709/217 |
| 2006/0143498 A1 | 6/2006 | Hatasaki et al. | |
| 2006/0179147 A1 | 8/2006 | Tran et al. | |
| 2006/0193247 A1 | 8/2006 | Naseh et al. | |
| 2006/0197147 A1* | 9/2006 | Anderson et al. | 257/331 |
| 2007/0016663 A1 | 1/2007 | Weis | |
| 2007/0078982 A1 | 4/2007 | Aidun et al. | |
| 2007/0124348 A1 | 5/2007 | Claborn et al. | |
| 2007/0150526 A1 | 6/2007 | D'Souza et al. | |
| 2007/0174417 A1* | 7/2007 | Bostick et al. | 709/217 |

* cited by examiner

*Primary Examiner* — Sarai Butler
(74) *Attorney, Agent, or Firm* — Patterson & Sheridan, LLP (57) ABSTRACT

Embodiments of the invention provide techniques for disaster recovery in the event of a database connection failure. In one embodiment, a network address for a secondary server may be stored in multiple data objects of a client computer. In the event of a failed connection to a primary server, the network address of the secondary server may be retrieved from one of the data objects stored in the client computer. When an updated network address for the secondary server is received, it may be propagated to the data objects of the client computer.

15 Claims, 5 Drawing Sheets

INTELLIGENT DISASTER RECOVERY FOR DATABASE CONNECTION FAILURES

BACKGROUND OF THE INVENTION

1. Field of the Invention

Embodiments of the invention generally relate to computer systems. More specifically, embodiments of the invention provide techniques to recover from a database connection failure.

2. Description of the Related Art

Databases are well known systems for storing, searching, and retrieving information stored in a computer. Access to a database may be provided by a client-server architecture, in which a client computer may connect to a server hosting a database. Typically, access to a particular database application is provided using a database driver. The database driver provides an application that allows a software application to interact with a database. By implementing a common interface, different database vendors allow the software application to interact with their particular database implementation. To interact with the database, the software application establishes a connection with the database, through the database driver, at a network address location for the database. Often, the network address is in the form of a socket, i.e., a combination of an internet protocol (IP) address and a port number. After a connection is established, however, in some situations, a server may become unavailable to a client. For example, a server may suffer a critical fault or error and be forced to shut down or a network connection between a software application and a database server at a particular network address may fail. Thus, the client computer may lose access to the database hosted by the server.

In such situations, the client computer may be connected to a database on a secondary server. More specifically, the secondary server (also referred to as a failover server) may provide the client computer with access to a back-up database that is equivalent to the database hosted on the unavailable server. However, in order to access the back-up database, the client computer needs to know a network address for connecting to the secondary server. Thus, there is a need for techniques for a client computer system to connect to a secondary server in order to recover from a database connection failure.

SUMMARY OF THE INVENTION

Embodiments of the invention provide techniques for disaster recovery for failures of database connections. One embodiment of the invention includes a method for connecting a client computer system to a failover computer system. The method may generally include detecting that a connection between the client computer system and a first computer system has failed. The client computer accesses at least one database application hosted by the first computer system using a database driver. The method may also include retrieving a network address of the failover computer system from one or more data objects stored by the client computer system and establishing a connection between the client computer system and the failover computer system. The failover computer system hosts a backup of the least one database application. The method may also include receiving, from the failover computer system, a network address for a second failover computer system and propagating the received network address to the one or more data objects of the client computer system.

In a particular embodiment, retrieving the network address of the failover computer system from one or more data objects may include accessing, sequentially, the database driver, a data source object managed by the database driver, a directory interface object, and a domain name system (DNS) object, until the network address of the failover computer system is retrieved.

Another embodiment of the invention includes a computer useable storage medium having a computer readable program, where the computer readable program when executed on a computer causes the computer to perform an operation. The operation may generally include detecting that a connection between the client computer system and a first computer system has failed. The client computer accesses at least one database application hosted by the first computer system using a database driver. The operation may also include retrieving a network address of the failover computer system from one or more data objects stored by the client computer system and establishing a connection between the client computer system and the failover computer system. The failover computer system may host a backup of the least one database application. The operation may also include receiving, from the failover computer system, a network address for a second failover computer system and propagating the received network address to the one or more data objects of the client computer system.

Still another embodiment of the invention includes a system having a processor and a memory. The memory may contain a database driver configured to access a database on a first computer system, wherein the database driver is configured to detect that a connection between the client computer system and a first computer system has failed. The client computer accesses at least one database application hosted by the first computer system using the database driver. The database driver may be further configured to retrieve a network address of the failover computer system from one or more data objects stored by the client computer system and establish a connection between the database driver and the failover computer system. The failover computer system may host a backup of the least one database application. The database driver may be further configured to receive, from the failover computer system, a network address for a second failover computer system and to propagate the received network address to the one or more data objects of the client computer system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A client-server system may include a client system connected to a remote database running on the server system. Of course, client server connections may be established between software processes running on the same physical computer system. In the event a client system loses a database connection, it may be necessary to re-establish the database connection to maintain a service on the client system. One technique for recovering from losing a connection to a primary server is to connect to a failover server. Generally, the failover server provides the same applications and data as was provided by the disconnected server. As stated, however, the client system needs to know a network address before it can establish a connection with the secondary server.

Embodiments of the invention allow a client computer system to recover from a database connection failure. In particular, embodiments of the invention allow a client computer system to obtain a network address of a secondary or failover server and establish a connection with the secondary server. Also, when a connection is established with the secondary server, additional failover addresses may be received and stored by the database driver on the client computer. In one embodiment, such network addresses may be shared among multiple data objects of the client computer. For example, the address of a secondary server may be stored in a database driver (i.e., any software configured to connect to a database), in a directory object (e.g., a Java Naming and Directory Interface object), or in a DNS (domain name system) object. In the event a connection to a primary server fails, the network address of the secondary server may be retrieved from one of the data objects stored in the client computer. Further, the secondary address in any of these objects may be updated periodically by a system administrator.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
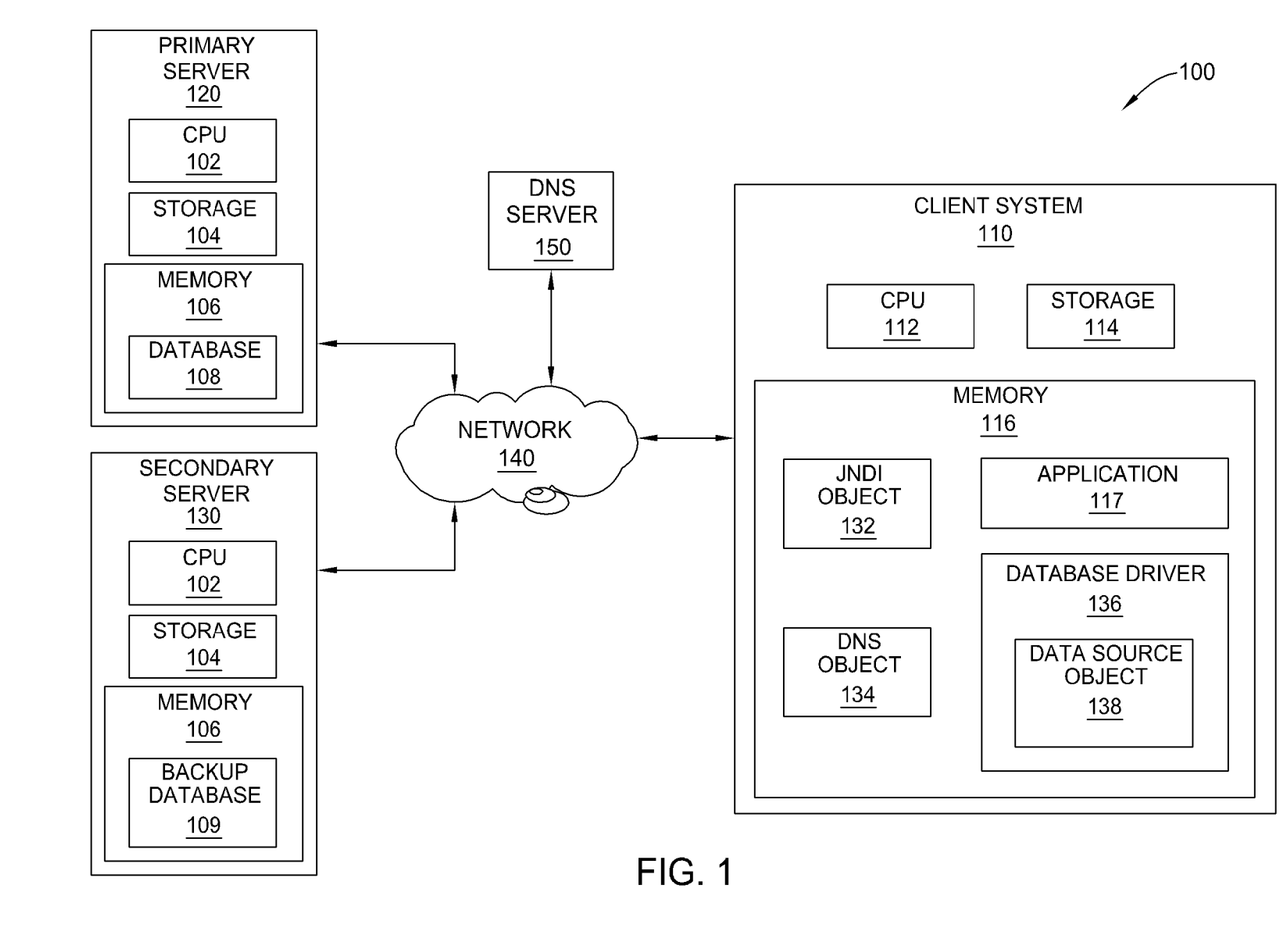
FIG. 1 is a block diagram that illustrates a client server view of a computing environment, according to one embodiment of the invention.

FIG. 1 is a block diagram that illustrates a client server view of computing environment 100, according to one embodiment of the invention. As shown, computing environment 100 includes a client system 110, a primary server 120, a secondary server 130, a Domain Name System (DNS) server 150, and network 140. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, primary server 120 and secondary server 130 may include a central processing unit (CPU) 102, which obtains instructions and data from memory 106 and storage 104. CPU 102 is a programmable logic device that performs all the instruction, logic, and mathematical processing in a computer. Storage 104 stores application programs and data for use by client system 110. Storage 104 includes hard-disk drives, flash memory devices, optical media and the like. Illustratively, memory 106 of primary server 120 includes a database 108. For example, database 108 may be a relational database, such as the DB2® database available from IBM®. Similarly, memory 106 of secondary server 130 also includes a database. In this case, a backup database 109 which may be configured to provide a complete functional backup to database 108 running on primary server 120. Primary server 120 and secondary server 130 may be operably connected to the network 140, which generally represents any kind of data communications network. Accordingly, network 140 may represent both local and wide area networks, including the Internet.

Also as shown, client system 110 may include CPU 112, which obtains instructions and data from memory 116 and storage 114. Memory 116 includes application 117, which generally represents a useful software program. Application 117 may be configured to read and/or write data, via network 140, from database 108 stored in primary server 120. For example, application 117 may be a data query tool configured to enable users to compose queries, and to execute those queries to retrieve data from database 108. Additionally, memory 116 includes a Java Naming and Directory Interface (JNDI) object 132, a DNS object 134, and a database driver 136. JNDI object 132 is a software component configured to provide a unified interface to multiple naming and directory services.

In one embodiment, DNS object 134 may represent a DNS cache configured to store recently determined sets of domain names and corresponding network addresses. In another embodiment, DNS object 134 may represent a local DNS table storing network addresses entered by a system administrator, e.g., entries in a hosts file. In yet another embodiment, DNS object 134 may represent a software component configured to interface with a remote DNS look-up service, for example DNS server 150, in order to retrieve network addresses for domain names. Database driver 136 is a software component configured to enable client system 110 to interface with a remote database, such as database 108 or backup database 109. For example, database driver 136 may represent a Java Database Connectivity (JDBC) driver. As is known, JDBC provides a standard defining how Java® software applications access database data. As shown, database driver 136 includes a data source object 138. The data source object 138 may be used to describe a connection to a database, e.g., by providing an IP address specifying the address of the host of the database system.

In one embodiment, secondary server 130 may be configured as a failover server for primary server 120. That is, in the event that primary server 120 becomes unavailable to client system 110 (e.g., due to a software, hardware failure or network failure), it may be replaced by secondary server 130. Thus, application 117 may continue to function by interacting with backup database 109 on secondary server 130. In the event that primary server 120 fails, client system 110 requires the network address of secondary server 130 (i.e., the failover address) to connect to backup database 109.

Figure 2:
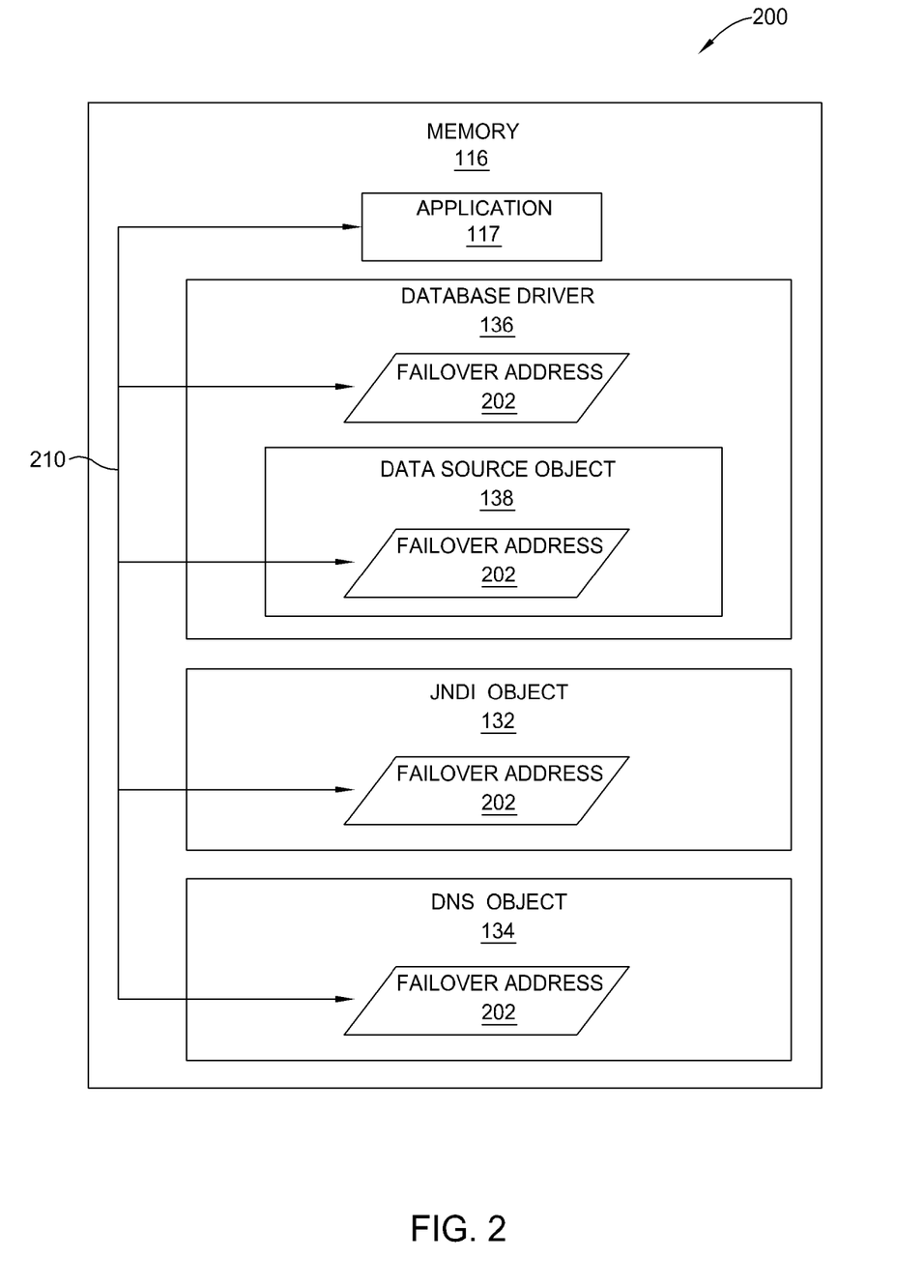
FIG. 2 illustrates a relational view of software components of a client system configured to retrieve a failover address, according to one embodiment of the invention.

FIG. 2 is a diagram illustrating software components 200 of a client system 110 configured to determine a failover address 202, according to one embodiment of the invention. As shown, client system 110 may be configured to store failover address 202 in multiple data objects. More specifically, failover address 202 may be stored in any or all of JNDI object 132, DNS object 134, database driver 136, or data source 138. In one embodiment, failover address 202 may initially be received as part of establishing a connection with primary server 120. That is, when client system 110 establishes a connection with primary server 120, the primary server 120 may provide a failover address to the client system 110. Additionally, once received, the client system 110 may propagate the address to other data objects of client system 110. Alternatively, failover address 202 may be manually configured in client system 110 by a user or system administrator. For example, DNS object 134 may be limited to manual configuration of a failover address. A method for storing failover address 202 in client system 110 is described below with reference to FIG. 3.

In the event client system 110 loses an established connection with primary server 120, client system 110 may be configured to retrieve failover address 202 from one of multiple data objects in which it is stored. Illustratively, failover address 202 may be written and/or retrieved via a bus 210. Methods for retrieving the failover address are described below with reference to FIGS. 4-5.

Of course, the systems illustrated in FIGS. 1 and 2 are provided for illustrative purposes only, and are not intended to be limiting of the invention. Other embodiments are also contemplated. For example, client system 110 may include additional (or fewer) locations for storing a failover address. In another example, the stored failover addresses may include address information for multiple backup servers.

Figure 3:
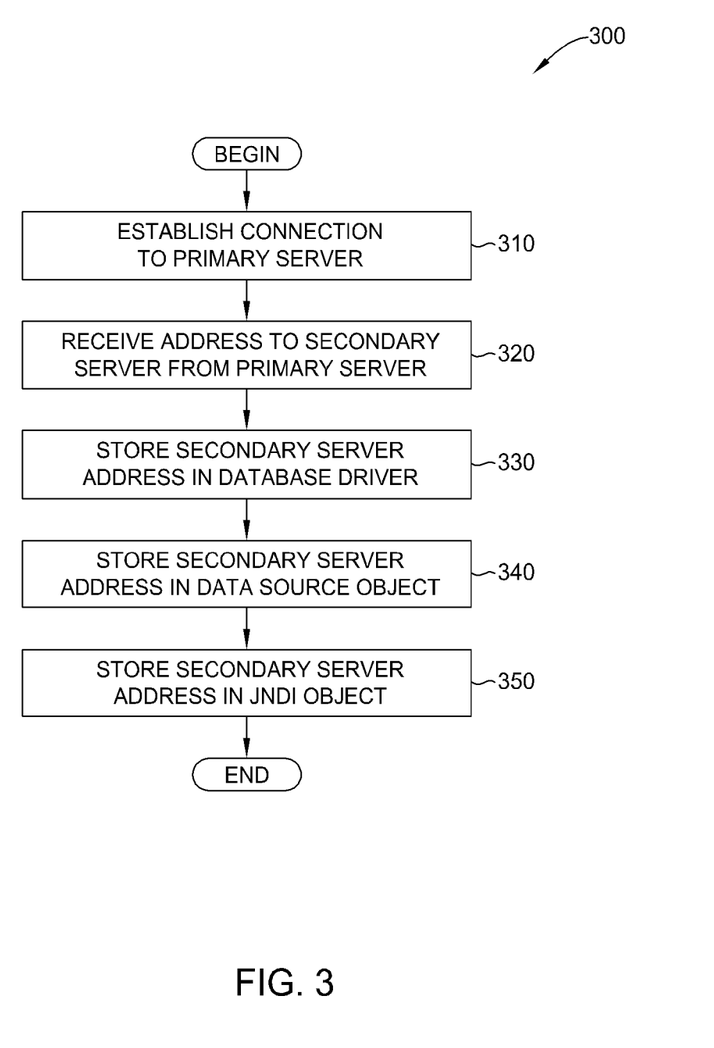
FIG. 3 illustrates a method for storing a failover address in a client system, according to one embodiment of the invention.

FIG. 3 illustrates a method 300 for storing a failover address in a client system, according to one embodiment of the invention. Persons skilled in the art will understand that, even though the method is described in conjunction with the system of FIGS. 1-2, any system configured to perform the steps of method 300, in any order, is within the scope of the present invention.

As shown, method 300 begins at step 310, where a connection to a primary server is established. For example, client system 110 may establish a connection with primary server 120, allowing application 117 to retrieve and/or write data from database 108. At step 320, an address to a secondary server (i.e., a failover address) may be received from the primary server 120.

At step 330, the failover address may be stored in a database driver. For example, FIG. 2 shows failover address 202 stored in database driver 136 or data source 138. Database driver 136 may be, for example, a JDBC driver, and may include data source 138 configured to specify a connection to a database. At step 340, the failover address may be stored in a data source of the database driver. For example, FIG. 2 shows failover address 202 stored in data source 138 of database driver 136. At step 350, the failover address may be stored in a JNDI object (or other directory interface object). For example, FIG. 2 shows failover address 202 stored in JNDI object 132. After step 350, the method 300 terminates.

Figure 4:
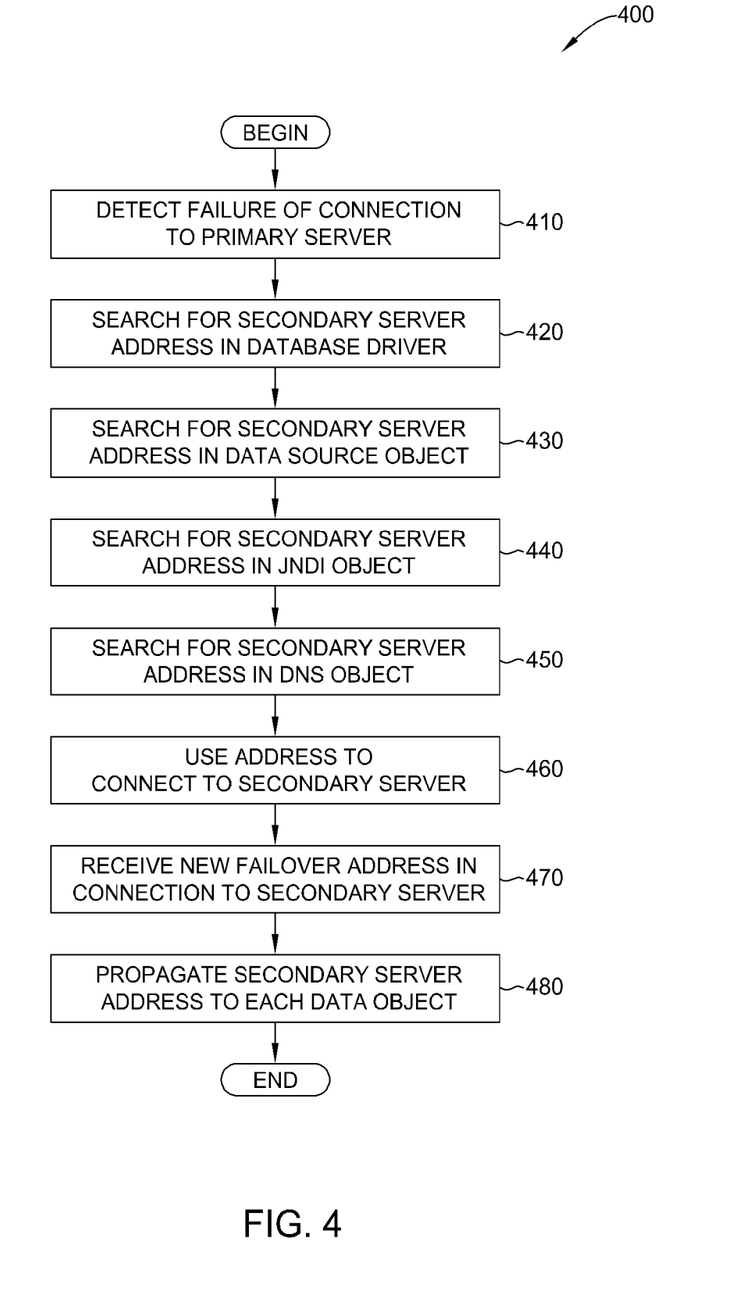
FIG. 4 illustrates a method for retrieving a failover address stored in a client system, according to one embodiment of the invention.

FIG. 4 illustrates a method 400 for retrieving a failover address stored in a client system, according to one embodiment of the invention. Persons skilled in the art will understand that, even though the method is described in conjunction with the system of FIGS. 1-2, any system configured to perform the steps of method 400, in any order, is within the scope of the present invention.

As shown, method 400 begins at step 410, where a failure of a connection to a primary server may be detected. For example, client system 110 may detect a loss of a connection to primary server 120. Thus, application 117 may not be able to interact with database 108. In response, client system 110 may be configured to attempt to determine a network address for secondary server 130. Accordingly, client system 110 may be configured to perform steps 420-450 in order to determine if a failover address has been stored in at least one of multiple locations. A failover address may have been stored using, for example, method 300 described above. In one embodiment, steps 420-450 may be performed until a failover address is located, at which time method 400 may continue at step 460.

At step 420, a database driver may be searched for an address for a secondary server. For example, database driver 136 may be searched for a failover address 202, corresponding to the network address of secondary server 130. At step 430 (assuming a failover address is not found at step 420), a data source object may be searched for the failover address. As described above, the data source object provides a data structure within the database driver configured to store network address location data. At step 440, a JNDI object (or other directory interface object) may be searched for the failover address. At step 450, a DNS object may be searched for the failover address. For example, DNS object 134 may be searched for a failover address 202. In one embodiment, DNS object 134 may represent a DNS cache or table included in client system 110. In another embodiment, DNS object 134 may represent a software module configured to access DNS server 150 over network 140, in order to search for a failover address.

At step 460, a failover address found in steps 420-450 may be used to connect to a secondary server. For example, failover address 202 may be used by client system 110 to connect to secondary server 130. At step 470, a new failover address may be received in the connection established at step 460. For example, a new failover address 202 may be received by client system 110 from secondary server 130.

At step 480, the new failover address received at step 470 may be propagated to the data objects included in the client system. For example, the new failover address 202 (received from secondary server 130) may be updated in database driver 136, in data source object 138, and/or in JNDI object 132. Thus, in the event of a failed connection to secondary server 130, client system 110 may be able to establish a failover connection back to primary server 120, or to another server (not shown). Further, in the event the database connection established at 460 fails, the new address is available in multiple, redundant locations. Thus, embodiments of the invention provide a highly fault-tolerant approach to connection recovery. After step 480, the method 400 terminates.

Figure 5:
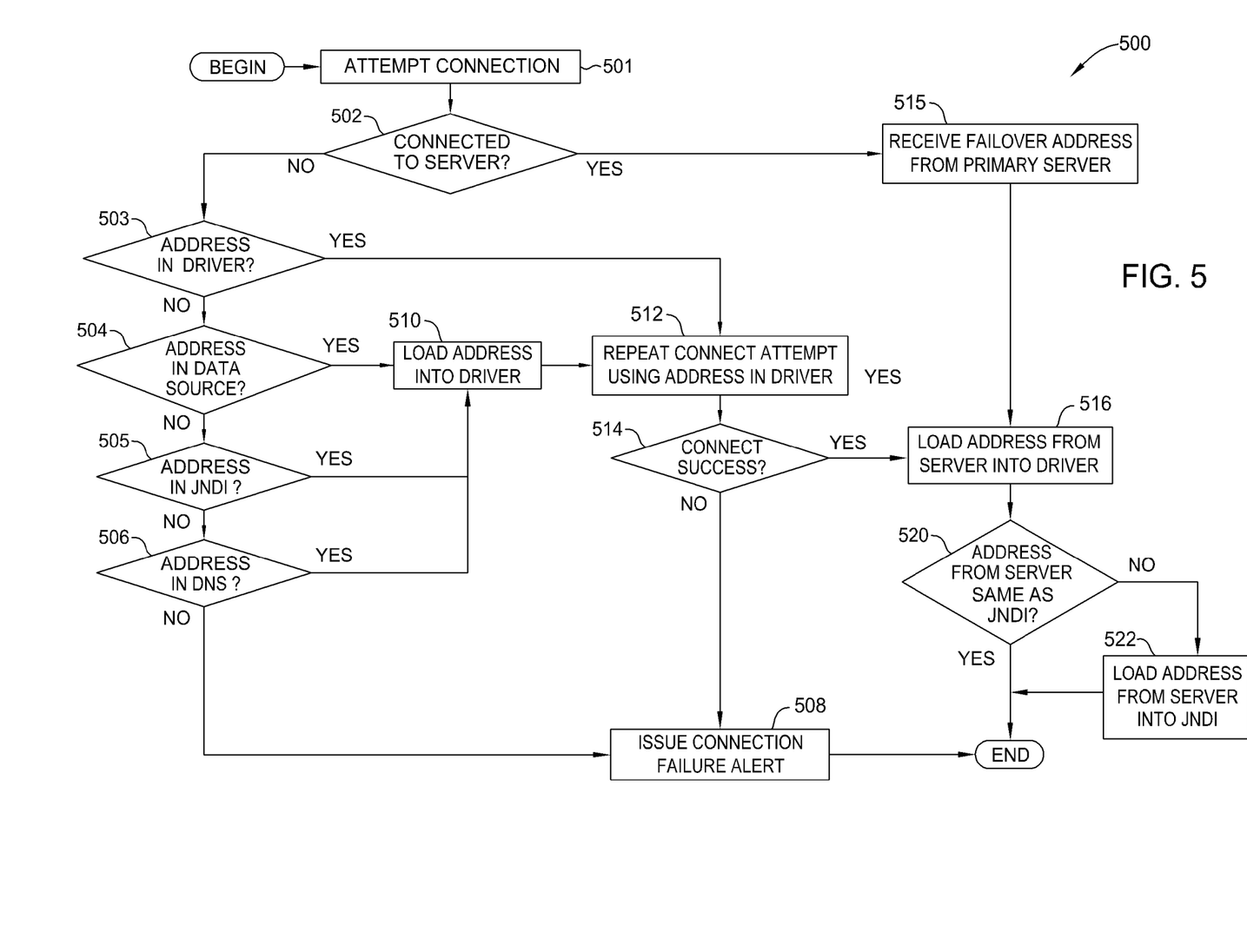
FIG. 5 illustrates a method for establishing a connection with a database server, according to one embodiment of the invention.

FIG. 5 illustrates a method 500 for establishing a connection with database server, according to one embodiment of the invention. Persons skilled in the art will understand that, even though the method is described in conjunction with the system of FIGS. 1-2, any system configured to perform the steps of method 500, in any order, is within the scope of the present invention.

As shown, method 500 begins at step 501, where a network connection to a primary server may be attempted to be established. For example, client system 110 may attempt a connection to primary server 120. At step 502, the client system may determine whether the connection was successfully established. Once connected, the client system may read and/or write data from database 108.

In one embodiment, if the connection was successfully established, then at step 515, a failover address may be received from the primary server. For example, when connecting to client system 110, primary server 120 may transmit a failover address for secondary server 130. At step 516, the received failover address may be stored by the database driver. More specifically, the failover address may be stored in memory allocated by the database driver itself, and/or in a data source object managed by the database driver. At step 520, it may be determined whether the received failover address is the same as a failover address then currently stored in a JNDI object (e.g., JNDI object 132). If not, then at step 522, the received failover address may be stored in the JNDI object, thus replacing a previous failover address. After either step 520 or step 522, the method 500 terminates.

However, if the attempted connection was unsuccessful, then at step 503, it is determined whether a failover address is currently stored in the database driver. For example, failover address 202 may have been stored in database driver 136 using method 300 described above. If so, then at step 512, another connection is attempted using the failover address stored in the database driver (e.g., using failover address 202 stored in database driver 136). At step 514, it is determined whether the attempted connection using the failover address was successful. If so, the method 500 continues at step 516 (described above). Otherwise, at step 508, a notice of connection failure may be issued. After step 508, the method 500 terminates.

Otherwise if the database driver does not include a failover address, then at step 504, it is determined whether a failover address is stored in a data source object of the database driver. If so, at step 510, the stored failover address may be loaded into the database driver (e.g., in database driver 136). The method 500 then continues at step 512 (described above). However, if the data source object does not store a failover address, at step 505, it may be determined whether a failover address is stored in a JNDI object (or other directory interface object) of the client system. If so, then method 500 continues at step 510. The method 500 then continues at step 512 (described above). If the JNDI object does not include a failover address, then at step 506, it may be determined whether a failover address is available from a DNS object (e.g., DNS object 134). That is, it may be determined whether a failover address is stored in a local cache or table of client system 110, or whether a DNS server may provide a failover address. If so, then method 500 continues at step 510. The method 500 then continues at step 512 (described above). Otherwise, the method 500 continues at step 508 (described above).

Advantageously, embodiments of the invention allow a client computer to recover from losing a database connection. Currently, connecting to a failover server typically requires manual intervention or custom configuration of recovery systems. Further, as part of establishing a connection to a secondary or failover system, new failover addresses may be provided. By providing methods for intelligently storing and searching of a failover address in the client system, embodiments of the invention improve the reaction time and flexibility in recovering from such lost connections.

While the foregoing is directed to embodiments of the present invention, other and further embodiments of the invention may be devised without departing from the basic scope thereof, and the scope thereof is determined by the claims that follow.

What is claimed is:

1. A computer-implemented method for a database driver providing database access to client application on a client computer system to connect to a failover computer system, comprising:

attempting, by the client application, to re-establish a connection between the client computer system and the first computer system after the client computer system is disconnected from the first computer system, wherein the first computer system hosts a database application accessed at a primary network address by a database driver on the client computer system;

upon determining the client application is unable to re-establish the connection between the client computer system and the first computer system, retrieving a first network address of a first failover computer system from one or more data objects stored by the client computer system, wherein the first network address was received from the first computer system prior to attempting to re-establish the connection, and wherein the one or more data objects stored on the client application are accessed in a predetermined order until the first network address is retrieved, wherein retrieving the network address of the first failover address comprises accessing, in the predetermined order on the client computer system, the database driver, a data source object managed by the database driver, a directory interface object, and a domain name system (DNS) object, until the network address of the first failover computer system is retrieved;

establishing a connection between the client computer system and the failover computer system, wherein the first failover computer system hosts a backup of the at least one database application;

receiving, from the failover computer system, a second network address for a second failover computer system; and storing the second network address in at least a first one of the one or more data objects stored by the client computer system, wherein storing the second network address comprises:

determining whether the one or more data objects store the same network address as the received second network address, and if not, storing the received network address in at least one of the one or more data objects.

2. The computer-implemented method of claim 1, wherein the database driver is an implementation of a Java Database Connectivity (JDBC) driver standard.

3. The computer-implemented method of claim 1, wherein the DNS object comprises a DNS cache stored on the client computer system configured to store recently resolved domain names and corresponding network addresses.

4. The computer-implemented method of claim 1, wherein the DNS object comprises a local DNS table storing network addresses entered by a system user.

5. The computer-implemented method of claim 1, wherein the DNS object comprises a software component configured to interface with a DNS server in order to retrieve network addresses for domain names.

6. A computer useable storage medium having a computer readable program, wherein the computer readable program when executed on a computer causes the computer to perform an operation, comprising:

attempting, by the client application, to re-establish a connection between the client computer system and the first computer system after the client computer system is disconnected from the first computer system, wherein the first computer system hosts a database application accessed at a primary network address by a database driver on the client computer system;

upon determining the client application is unable to re-establish the connection between the client computer system and the first computer system, retrieving a first network address of a first failover computer system from one or more data objects stored by the client computer system, wherein the first network address was received from the first computer system prior to attempting to re-establish the connection, and wherein the one or more data objects stored on the client application are accessed in a predetermined order until the first network address is retrieved, wherein retrieving the network address of the first failover address comprises accessing, in the predetermined order on the client computer system, the database driver, a data source object managed by the database driver, a directory interface object, and a domain name system (DNS) object, until the network address of the first failover computer system is retrieved;

establishing a connection between the client computer system and the failover computer system, wherein the first failover computer system hosts a backup of the at least one database application;

receiving, from the failover computer system, a second network address for a second failover computer system; and storing the second network address in at least a first one of the one or more data objects stored by the client computer system, wherein storing the second network address comprises:

determining whether the one or more data objects store the same network address as the received second network address, and if not, storing the received network address in at least one of the one or more data objects.

7. The computer useable storage medium of claim 6, wherein the database driver is an implementation of a Java Database Connectivity (JDBC) driver standard.

8. The computer useable storage medium of claim 6, wherein the DNS object comprises a DNS cache stored on the client computer system configured to store recently resolved domain names and corresponding network addresses.

9. The computer useable storage medium of claim 6, wherein the DNS object comprises a local DNS table storing network addresses entered by a system user.

10. The computer useable storage medium of claim 6, wherein the DNS object comprises a software component configured to interface with a DNS server in order to retrieve network addresses for domain names.

11. A system, comprising:

a processor; and a memory containing a client application and a database driver configured to access a database on a first computer system, wherein the client application, when executed by the processor, is configured to:

attempt to re-establish a connection between the client computer system and the first computer system after the client computer system is disconnected from the first computer system, wherein the first computer system hosts a database application accessed at a primary network address by a database driver on the client computer system, upon determining the client application is unable to re-establish the connection between the client computer system and the first computer system, retrieve a first network address of a first failover computer system from one or more data objects stored by the client computer system, wherein the first network address was received from the first computer system prior to attempting to re-establish the connection, and wherein the one or more data objects stored on the client application are accessed in a predetermined order until the first network address is retrieved, wherein retrieving the network address of the first failover address comprises accessing, in the predetermined order on the client computer system, the database driver, a data source object managed by the database driver, a directory interface object, and a domain name system (DNS) object, until the network address of the first failover computer system is retrieved, establish a connection between the database driver and the failover computer system, wherein the first failover computer system hosts a backup of the at least one database application, receive, from the failover computer system, a second network address for a second failover computer system, and store the second network address in at least a first one of the one or more data objects stored by the client computer system, wherein storing the second network address comprises:

determining whether the one or more data objects store the same network address as the received second network address; and if not, storing the received network address in at least one of the one or more data objects.

12. The system of claim 11, wherein the database driver is an implementation of a Java Database Connectivity (JDBC) driver standard.

13. The system of claim 11, wherein the DNS object comprises a DNS cache stored on the client computer system configured to store recently resolved domain names and corresponding network addresses.

14. The system of claim 11, wherein the DNS object comprises a local DNS table storing network addresses entered by a system user.

15. The system of claim 11, wherein the DNS object comprises a software component configured to interface with a DNS server in order to retrieve network addresses for domain names.

* * * * *